UNITED STATES PATENT OFFICE.

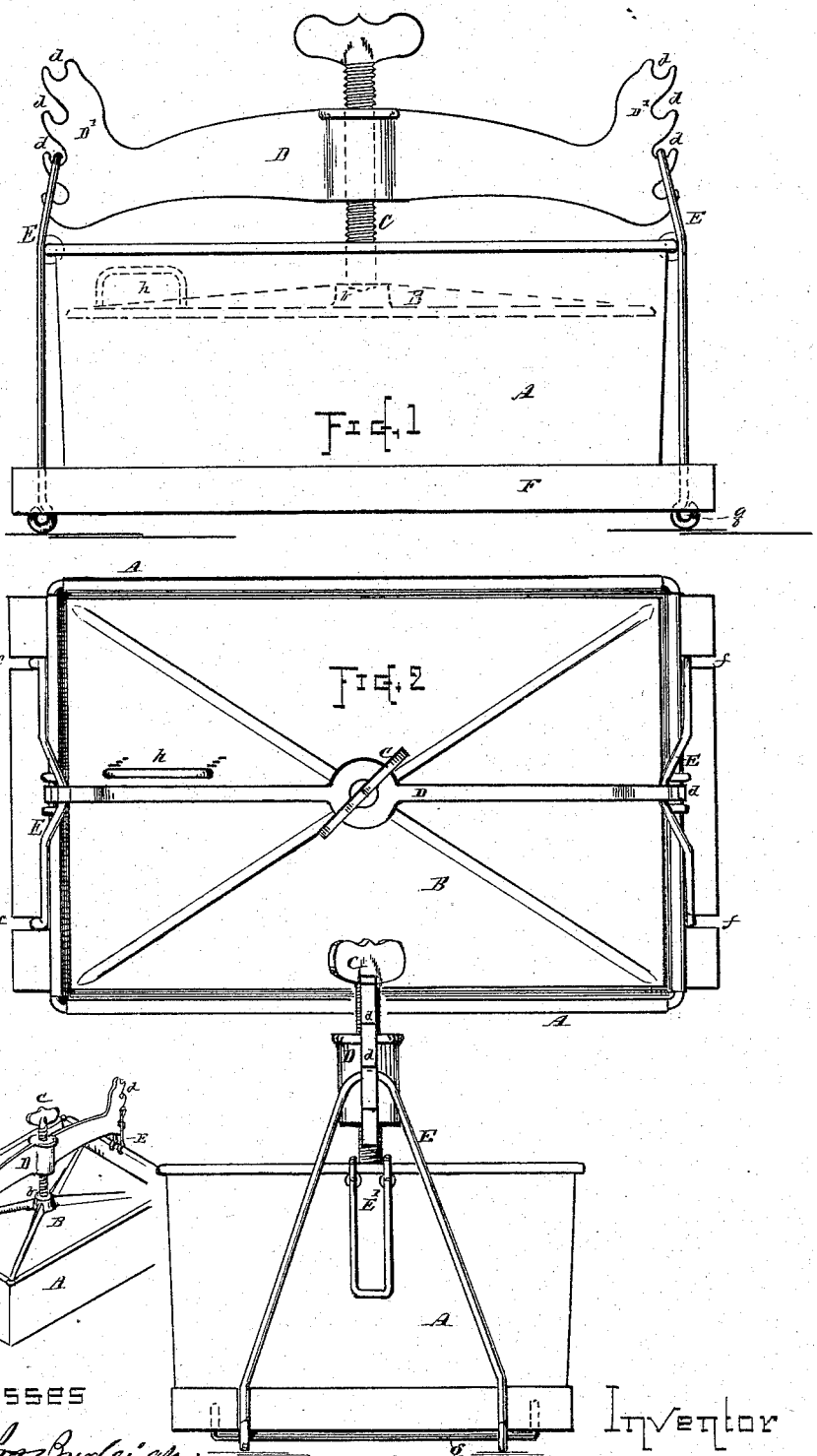

EDWARD WRIGHT, OF WORCESTER, MASSACHUSETTS.

IMPROVEMENT IN MEAT AND VEGETABLE PRESSES.

Specification forming part of Letters Patent No. 156,866, dated November 17, 1874; application filed September 30, 1874.

*To all whom it may concern:*

Be it known that I, EDWARD WRIGHT, of the city and county of Worcester and State of Massachusetts, have invented certain new and useful Improvements in Kitchen-Presses; and I do hereby declare that the following is a full, clear, and exact description of the same, reference being had to the accompanying drawings, which form a part of this specification, and in which—

Figure 1 represents a side view of my improved kitchen-press. Fig. 2 represents a plan view of the same. Fig. 3 represents an end view of the same, and Fig. 4 represents a perspective view of the press when made in a somewhat-modified form.

The object of my present invention is to provide a cheap, convenient, and serviceable press adapted to ordinary household or kitchen uses in pressing vegetables, fruit, meats, &c. To this end my invention consists in an improved kitchen-press, wherein the screw-bar is made with a series of notches at its ends, and is combined with the pan or lower part of the press by means of loose wire loops, as hereinafter set forth.

In the drawings, A denotes the receptacle in which to place the material to be pressed, preferably a rectangular or circular pan, formed of tinned sheet-iron, about nine inches, more or less, in length, and some three inches, more or less, in depth. B indicates the top plate, for applying the pressure to the material. This is made to nearly fill the area of the pan A, and is provided with a suitable boss, $b$, for receiving the end of the pressure-screw C. D indicates the cross-bar, through the central part of which the screw C is arranged, while its ends D' are each provided with a series of hooks or notches, $d\ d\ d$, to receive the connecting-loops E, as shown. F indicates a base or bottom support, consisting of a piece of board, on which the pan A is supported, and to the ends of which the connecting-loops E are in the present instance attached, said loops being passed down through slots $ff$, and bent around horizontal wires $g$, in such manner that their bent ends form feet, on which the press stands, while the loops are loose to swing outward up and down, as desired.

In small-sized presses the base F may be dispensed with, and the loops simply secured around the top wiring of the pan, as shown in Fig. 4, and as at E'.

$h$ indicates a loop or handle for the plate B.

The press is used as follows: The corned-beef or other substance to be pressed is placed in the pan A, and the plate B laid on top. The bar D is then placed in position, with the end of screw C against the boss $b$, and the loops E swung up and hooked onto the most convenient notches $d\ d$, after which the pressure is produced by turning down the screw C.

The cross-bar D, being made with notches $d$, as shown, permits of convenient adjustment, easy removal, and requires but little movement on the screw when applying the pressure.

If desired, any ordinary tin pan of suitable size can be used in place of pan A; and, as the whole press is small, it can with its contents be placed in an ordinary refrigerator or closet without inconvenience.

The several parts of the press are simple in form, and free from each other, so that they can readily be cleansed; and the presses can be manufactured and sold for a very small amount, so as to come within the means of all who may desire such an article.

I am aware that small kitchen or pan presses have been heretofore manufactured and used, and I do not herein make claim, broadly, to such kitchen-presses; but What I do claim as new, and of my invention, and desire to secure by Letters Patent, is—

The within-described improved kitchen-press, consisting of the pan A, with or without base F, and having wire connecting-loops E, in combination with the removable screw-supporting bar D, provided at its ends with a series of hooks or notches, $d\ d$, the screw C, and plate B, all of said parts being constructed and arranged for operation substantially as and for the purpose set forth.

EDWARD WRIGHT.

Witnesses:
 CHAS. H. BURLEIGH,
 CHAS. B. STILWELL.